United States Patent
Zubas et al.

(10) Patent No.: US 10,574,826 B2
(45) Date of Patent: Feb. 25, 2020

(54) VISUAL VOICEMAIL METHOD FOR MANAGING DELETED MESSAGES

(71) Applicant: AT&T Mobility II LLC, Atlanta, GA (US)

(72) Inventors: Michael Robert Zubas, Marietta, GA (US); Brian Rainer, Lawrenceville, GA (US); William J. Sigmund, Cumming, GA (US)

(73) Assignee: AT&T Mobility II LLC, Altanta, GA (US)

( * ) Notice: Subject to any disclaimer, the term of this patent is extended or adjusted under 35 U.S.C. 154(b) by 0 days.

(21) Appl. No.: 16/009,974

(22) Filed: Jun. 15, 2018

(65) Prior Publication Data

US 2018/0295239 A1  Oct. 11, 2018

Related U.S. Application Data

(63) Continuation of application No. 15/397,261, filed on Jan. 3, 2017, now Pat. No. 10,027,814, which is a continuation of application No. 14/543,155, filed on Nov. 17, 2014, now Pat. No. 9,544,437, which is a continuation of application No. 13/688,501, filed on Nov. 29, 2012, now Pat. No. 8,917,824, which is a continuation of application No. 12/336,083, filed on Dec. 16, 2008, now Pat. No. 8,369,840.

(51) Int. Cl.
| | |
|---|---|
| *H04M 1/64* | (2006.01) |
| *H04M 3/533* | (2006.01) |
| *H04M 1/725* | (2006.01) |
| *H04M 3/537* | (2006.01) |
| *H04N 7/14* | (2006.01) |

(52) U.S. Cl.
CPC ..... *H04M 3/53366* (2013.01); *H04M 1/7255* (2013.01); *H04M 1/72583* (2013.01); *H04M 3/533* (2013.01); *H04M 3/537* (2013.01); *H04M 3/53333* (2013.01); *H04N 7/147* (2013.01); *H04M 2201/14* (2013.01); *H04M 2201/36* (2013.01); *H04M 2203/253* (2013.01)

(58) Field of Classification Search
CPC .......... H04M 3/53366; H04M 1/7255; H04M 1/72583; H04M 3/533
See application file for complete search history.

(56) References Cited

U.S. PATENT DOCUMENTS

| | | |
|---|---|---|
| 7,218,709 B2 | 5/2007 | Garg et al. |
| 2004/0136505 A1 | 7/2004 | Garg et al. |
| 2008/0167014 A1* | 7/2008 | Novick .............. H04M 3/53333 455/413 |

(Continued)

*Primary Examiner* — Simon King
(74) *Attorney, Agent, or Firm* — Chiesa Shahinian & Giantomasi PC

(57) ABSTRACT

A method for managing visual voicemail messages includes displaying a list of voicemail messages on a telecommunications handset, receiving user commands for operating on the voicemail messages including a delete message command and in response to a delete message command, marking a voicemail message for deletion with a delete timestamp and moving the voicemail message to a Deleted Messages folder. A Deleted Message Age Indicator function processes to control permanent deletion of voicemail messages in the Deleted Messages folder based on delete timestamps and a global Delete Time value in cooperation with a visual voicemail platform.

17 Claims, 4 Drawing Sheets

(56) References Cited

U.S. PATENT DOCUMENTS

| | | |
|---|---|---|
| 2008/0207176 A1 | 8/2008 | Brackbill et al. |
| 2008/0270560 A1 | 10/2008 | Tysowski et al. |
| 2009/0156176 A1 | 6/2009 | Hao et al. |
| 2009/0262910 A1 | 10/2009 | Scopes |

* cited by examiner

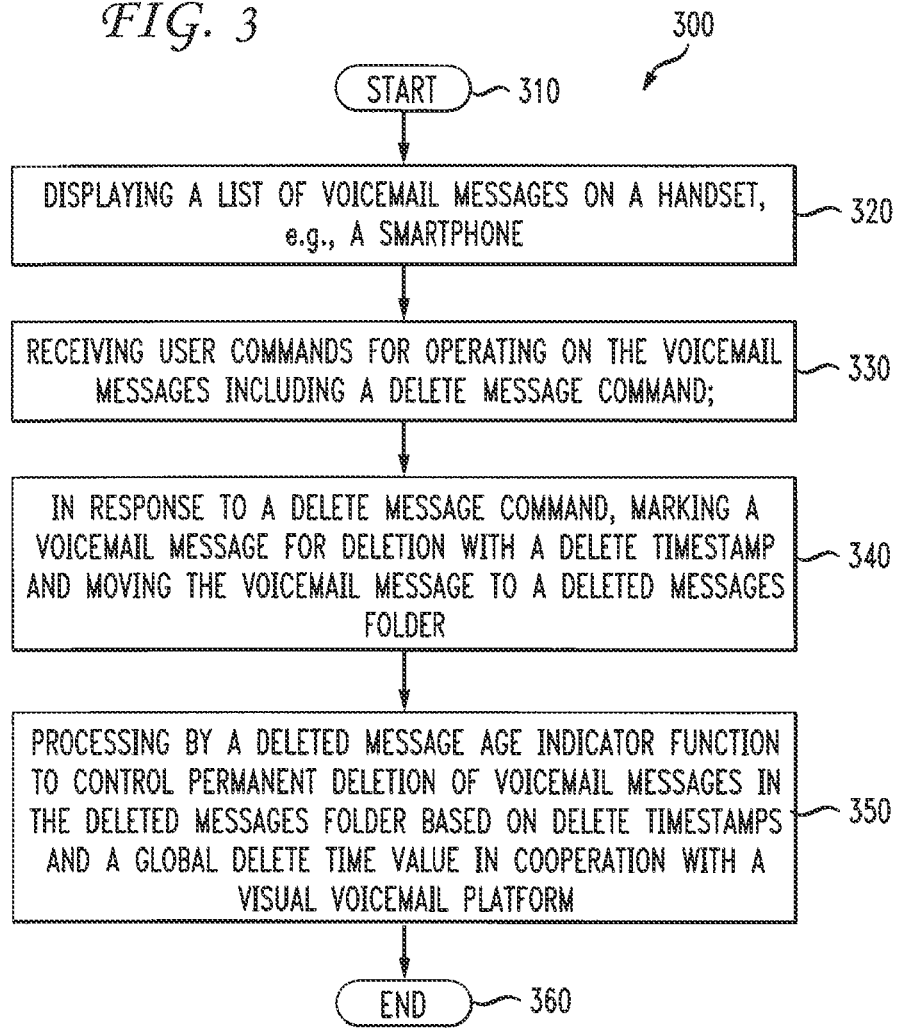
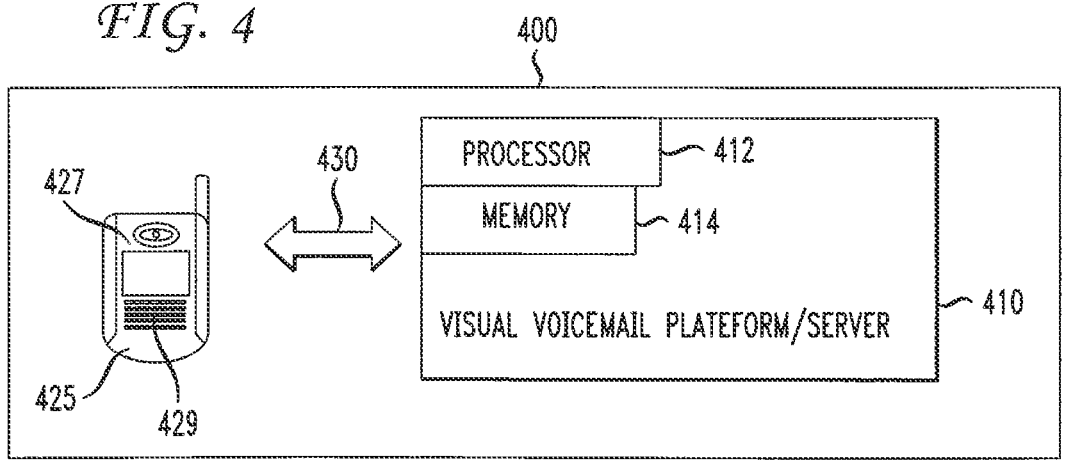

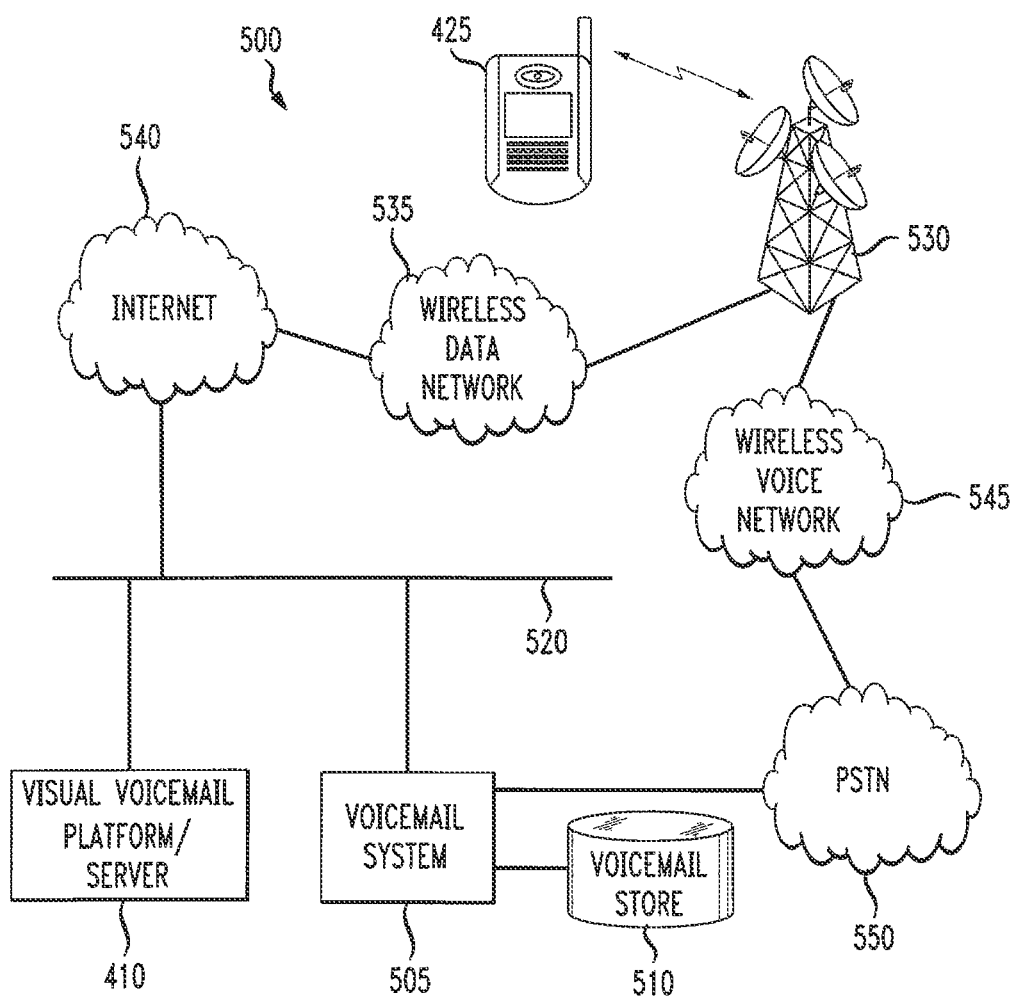

VISUAL VOICEMAIL METHOD FOR MANAGING DELETED MESSAGES

This application is a continuation of U.S. patent application Ser. No. 15/397,261, filed Jan. 3, 2017, which is a continuation of U.S. patent application Ser. No. 14/543,155, filed Nov. 17, 2014, now U.S. Pat. No. 9,544,437, issued on Jan. 10, 2017, which is a continuation of U.S. patent application Ser. No. 13/688,501, filed Nov. 29, 2012, now U.S. Pat. No. 8,917,824, issued on Dec. 23, 2014, which is a continuation of U.S. patent application Ser. No. 12/336,083, filed Dec. 16, 2008, now U.S. Pat. No. 8,369,840, issued on Feb. 5, 2013, all of which are incorporated herein by reference in their entirety.

BACKGROUND

The disclosed technology broadly relates to the management of voicemail messages and, more particularly relates to visual techniques for managing voicemail messages.

Visual voicemail—the use of visual techniques to manage voicemail messages—adds a visual aspect to phone voicemail. For example visual voicemail allows users to view a list of audio voicemail entries on a display screen inbox that includes visual indicators specifying whether the messages are new, urgent, saved, not yet heard, etc. The iPhone™ by Apple, Inc. is a multimedia smartphone with a multi-touch screen and a virtual keyboard rendered by the multi-touch screen that provides, among other features, visual voicemail. On the iPhone™, visual voicemail lets you see a list of your messages and choose which ones to listen to or delete, without having to listen to prior messages or instructions.

Conventionally, visual voicemail clients synchronize with a voicemail platform to update the status of messages between the client and voicemail platform. Messages currently are deleted from the displayed inbox and moved into a deleted messages folder. Where there are no deleted messages, there is no deleted messages folder displayed. FIG. 1 depicts a visual voicemail screenshot where only one voicemail message is listed. There are no deleted messages and therefore no deleted messages folder presented/displayed. FIG. 2 depicts a visual voicemail screenshot where several voicemail messages are listed, including a deleted messages folder in which deleted messages are stored prior to system deletion by the visual voicemail platform.

Subscribers use the deleted messages folder as secondary storage for old messages (they have the messages out of the displayed inbox). At that point in time, the subscriber believes that the messages that are in the deleted folder messages are in fact deleted. However, the messages in the deleted folder can be recovered from the deleted messages folder and placed back into the voicemail inbox. Messages stored in the deleted messages folder remain on the voicemail platform until they expire due to age, typically in 30 days. These expired messages are then synchronized between the visual voicemail client and voicemail platform by being deleted from both places. This current method places a burden on the voicemail platform as it is has to store messages that will be deleted as they expire due to age.

SUMMARY

The shortcomings identified above are addressed by a visual voicemail system and method for managing deleted messages for visual voicemail subscribers. In one embodiment of the disclosed technology, the user of a visual voicemail platform can determine when messages in the delete folder will be deleted from the phone and the platform, thereby reducing the amount of memory needed to store message that previously remained in memory until a system determined time had passed.

In one embodiment, a method for managing visual voicemail messages includes displaying a list of voicemail messages on a telecommunications handset; receiving user commands for operating on the voicemail messages including a delete message command; in response to a delete message command, marking a voicemail message for deletion with a delete timestamp and moving the voicemail message to a Deleted Messages folder; and processing by a Deleted Message Age Indicator function to control permanent deletion of voicemail messages in the Deleted Messages folder based on the delete timestamp and a global Delete Time value in cooperation with a visual voicemail platform.

The processing by the Deleted Message Age Indicator function includes providing the voicemail platform access to delete timestamps of messages in the Deleted Messages folder during a synchronization operation. Processing by the Deleted Message Age Indicator function can occur at the telecommunications handset, and/or at the visual voicemail platform. The method includes preconfiguring the visual voicemail platform with a global Delete Time value. Processing by the Deleted Message Age Indicator function at the telecommunications handset enables the handset to override, extend or shorten the global Delete Time value. The Deleted Message Age Indicator function cooperates with the visual voicemail platform to delete messages with timestamps that equal the global Delete Time value. While the global Delete Time value may be configured as any time, it is preferably configured as five (5) days, which may be reset by the user handset.

A computer readable medium encoded with computer program instructions for managing visual voicemail messages implements a method including displaying a list of voicemail messages on a telecommunications handset; receiving user commands for operating on the displayed voicemail messages including a delete message command; in response to a delete message command, marking a voicemail message for deletion with a delete timestamp and moving the voicemail message to a Deleted Messages folder; and processing by a Deleted Message Age Indicator function to control permanent deletion of the voicemail message in the Deleted Messages folder based on the delete timestamp and a global Delete Time value in cooperation with a visual voicemail platform.

In another embodiment, a visual voicemail message management system includes a server including a processor and a memory, wherein the processor operates a visual voicemail management platform. The telecommunications handset comprises an interactive display for displaying a list of voicemail messages stored in the handset that allows a handset user to input commands for operating on the displayed voicemail messages, a memory for storing voicemail messages and a processor for responding to the commands and operating on voicemail messages. The visual voicemail management system operates a Deleted Message Age Indicator function that monitors an age of voicemail messages stored in the handset memory and permanently deletes voicemail those messages whose age equals a global Delete Time value. The handset processor is adapted to respond to a command to delete a displayed voicemail message by tagging the message with a delete timestamp and moving the message into the Deleted Messages folder. The Deleted Message Age Indicator function is controlled by the processor on the telecommunications handset, or alternatively controlled by the processor operating the visual voicemail platform. The server and processor operating the visual voicemail platform are preconfigured with a global Delete Time value. Preferably, the telecommunications handset is adapted to override, extend or shorten a global Delete Time value.

BRIEF DESCRIPTION OF THE DRAWING FIGURES

Aspects of the disclosed technology will become apparent upon reading the following detailed description and upon reference to the accompanying drawings in which, like references may indicate similar elements:

FIG. 3 is a schematic block diagram description of a visual voicemail message management system in accordance with the disclosed technology;

FIG. 4 is a method for managing visual voicemail messages in accordance with the disclosed technology; and FIG. 5 is a schematic diagram of architecture for implementing the method and system of the disclosed technology.

DETAILED DESCRIPTION

In one embodiment, the disclosed technology provides for managing visual voicemail messages displayed or listed in a user device, such as a telecommunication handset, for example, on a display screen of a smartphone such as the iPhone™ by Apple, Inc. It should be noted, however, that the disclosed technology is intended for use with any telecommunication handset that supports visual voicemail, i.e., visual voicemail screen graphics, and is not intended to be limited to applications for an iPhone™ by Apple, Inc. In accordance with one aspect of the disclosed technology, the user may determine the age at which messages are deleted from the user device and the platform. The user may delete voicemail messages from the displayed list of voicemail messages, which are then moved to a Deleted Messages folder. The disclosed technology creates and operates a Deleted Messages Age Indicator function to monitor the age of voicemail messages stored in the Deleted Messages folder. Deleted message are stored in the Deleted Messages folder in association with a delete time stamp. The delete time stamp indicates the time at which the message was put in the delete folder The function deletes such stored messages permanently when it determines by the time stamp that a message has reached a global Delete Time value. The Deleted Message Age Indicator function synchronizes with the voicemail platform controlling the handset voicemail, including sharing deleted message timestamps with the platform during synchronization operations. The Deleted Message Age Indicator function can be implemented by a processor operating the visual voicemail platform (i.e., at the server), or by a processor operating at the telecommunications handset.

The function operates based on the global Delete Time value, but before the original or conventional aged expiration timer has elapsed. When the user, i.e., the handset, synchronizes with the voicemail platform, the voicemail platform reviews messages in the deleted messages folder and compares their associated time stamp with the global Delete Time value in association with the Deleted Message Age Indicator function. The global Delete Time value is programmable in the handset, which enables the handset to determine how the age of messages in the Deleted Messages folder, and to permanently delete messages. Master control of this value, however, is preferably controlled by the voicemail platform, allowing the service provider to better manage the network resources required to support voicemail messages.

Figure 1:
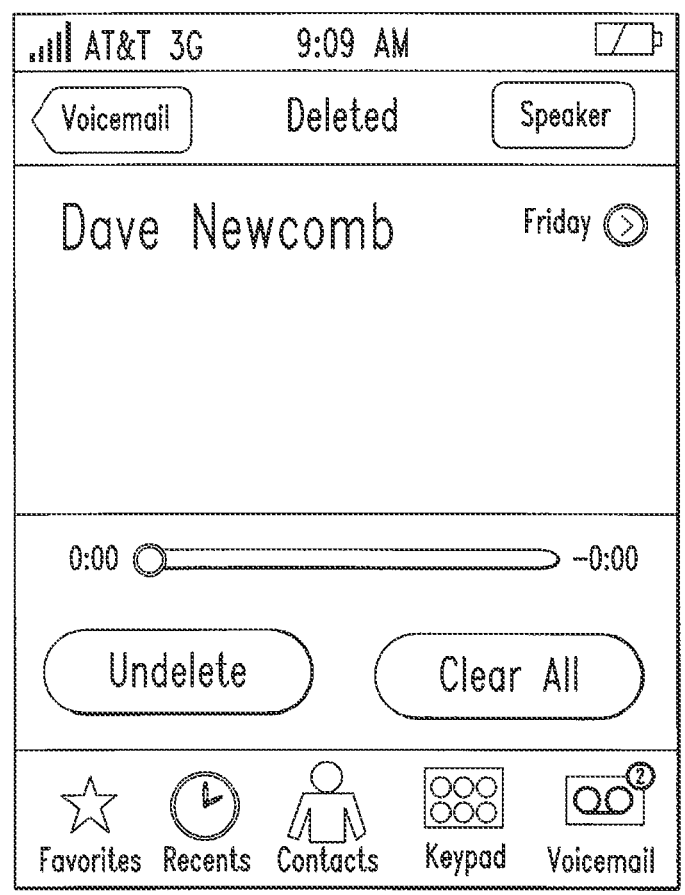
FIG. 1 is a screenshot of a conventional visual voice mail inbox display.
Figure 2:
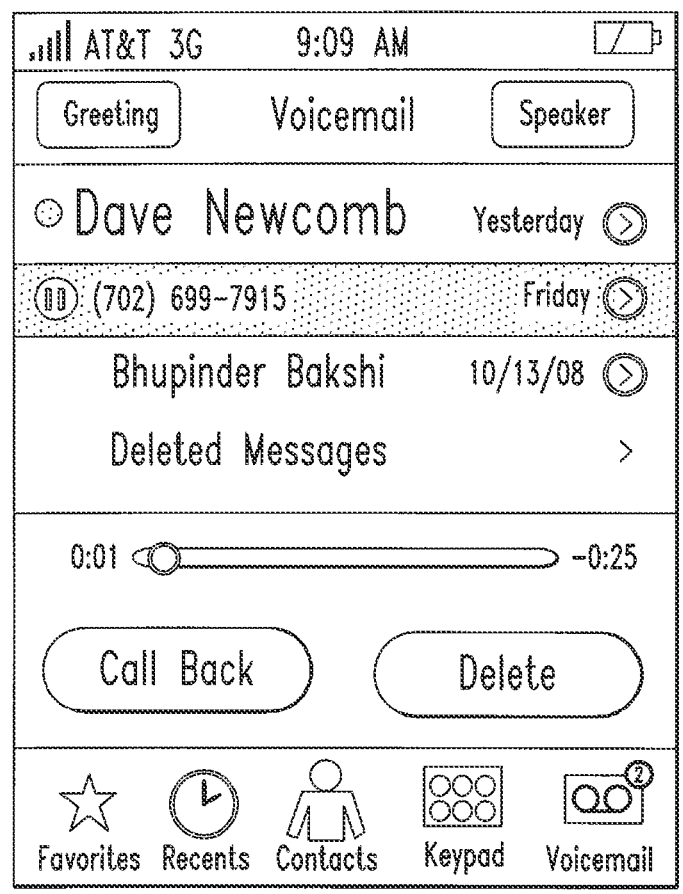
FIG. 2 is a screenshot of a conventional visual voicemail inbox display where deleted messages are stored in a deleted messages folder.

An embodiment of the disclosed technology for managing visual voicemail messages (300) is now described with reference to FIG. 3. Terminator (310) indicates a start of the method, and a block (320) defines a step of displaying a list of voicemail messages on a telecommunications handset. For example, the voicemail messages can be displayed in a handset inbox, such as shown in FIGS. 1 and 2 herein. A block (330) defines a step of receiving user commands for operating on the voicemail messages, including a delete message command. A handset user inputs commands to manipulate voicemail messages in the displayed list, for example, play, delete, undelete, etc.

At block (340) the following steps are taken: in response to a delete message command, marking a voicemail message for deletion with a delete timestamp, and moving the voicemail message to a Deleted Messages folder. The Deleted Messages folder icon is only displayed after a delete message command. For example, there are no deleted messages in the handset display of FIG. 1, but at least one message has been deleted from the inbox list displayed in FIG. 2, as indicated by the Deleted Messages folder icon. A block (350) defines a step or act of processing by a Deleted Message Age Indicator function to control permanent deletion of the voicemail message in the Deleted Messages folder based on that message's delete timestamp and a global Delete Time value in cooperation with a visual voicemail platform. They program ends at terminator (360).

The processing by the Deleted Message Age Indicator function can include providing the voicemail system access to timestamps of messages in the Deleted Messages folder during a synchronization operation, and may be implemented on the telecommunications handset or the server operating the visual voicemail platform.

The method includes that the visual voicemail platform is preconfigured with a global Delete Time value, and deletes message from the Deleted Messages folder when it identifies that the message age reaches the global Delete Time value. While the global Delete Time value may be configured as any time, it is preferably configured as five (5) days, which may be reset by the user handset. That is, the processing by the Deleted Message Age Indicator function enables the telecommunications handset to set, override, extend or shorten the global Delete Time value. The method for managing visual voicemail messages may be encoded within a set of computer program instructions stored on a computer readable medium, where a processor can access and process the stored instructions to execute the method.

A visual voicemail message management system (400) is now described with reference to FIG. 4. System (400) includes a visual voicemail management platform/server (410) that is shown in communication with a telecommunications handset (425). In FIG. 4, the handset is depicted as a cell phone in radio communication by link (430) with a server comprising the visual voicemail platform (410). Communication link (430) may be implemented by any known technology without deviating from the scope and spirit of the invention, for example, by the architecture depicted in FIG. 5, described below.

Telecommunications handset (425) includes an interactive display (427) for displaying a list of voicemail messages received and stored by the handset, such as those disclosed in FIGS. 1 and 2. The telecommunications handset and interactive display are constructed to allow a user to input commands for performing operations on displayed voicemail messages, including a delete message command. A processor (429) is included in the handset for responding to user commands by executing operations on voicemail messages stored in the handset. The visual voicemail management system (400) operates a Deleted Message Age Indicator function that monitors an age of voicemail messages stored in a Deleted Messages folder and permanently deletes any voicemail message stored therein upon determining that its age equals a global Delete Time.

During system operation, processor (429) responds to a command to delete a displayed voicemail message by tagging the message with a delete timestamp and moving the message into the Deleted Messages folder. The Deleted Message Age Indicator function may be controlled by the processor (429) in the telecommunications handset (425), or by a processor (412) operating within the visual voicemail platform/server (410).

The Deleted Message Age Indicator function synchronizes the visual voicemail platform/server (410) with Deleted Messages folder, allowing the visual voicemail platform to access message timestamps for comparison with the global Delete Time value. Initial checking/synchronization are not required from the voicemail platform, therefore, as same may be initiated by the user via the telecommunications handset. The visual voicemail platform/server (410) is configured with a global Delete Time value that defines the date at which messages stored in the Deleted Messages folder are permanently deleted. Preferably, the telecommunications handset is adapted to override, extend or shorten a global Delete Time value.

Referring now to FIG. 5, architecture (500) for operating with the system and method for managing deleted messages for visual voicemail subscribers is now described. Visual voicemail platform/server (410) provides the functionality for visual voicemail management described herein. Visual voicemail platform/server (410) accesses messages stored in voicemail store (505) and made available via voicemail system (505). Visual voicemail platform/server (410) and voicemail system (505) are connected to a local area network, or LAN (520). LAN (520) facilitates communication between visual voicemail platform/server (410) and voicemail system (505) using any known communication protocol such as HTTP, IMAP4, XML, SMPP, without limitation, or any combination thereof. A handset (which may be a cell phone 425) communicates with visual voicemail platform/server (410) using a communication protocol such as HTTP, to receive information about voicemail messages and to initiate requests for playback and management of such messages under user control.

As shown, such communication takes place where the handset (425) communicates wirelessly via wireless antenna (530) to a wireless data network (535) and over the Internet (540) using well-known digital communication techniques. Handset (425) also is shown in communication with wireless voice network (545) and Public Switched Telephone Network, PSTN (550) via known techniques for mobile telephone implementation. Conventional dial-in to voicemail system (505) is facilitated via voice network (545) and PSTN (550), although in some situations such dial-in may be rendered unnecessary in view of the direct digital communication capability between handset (425) and the visual voicemail platform (410), where it comprises a server. The visual voicemail system (505) and method (300) are capable of operation in connection with legacy and IP based networks (legacy and standards-based voicemail, etc.) using IP/VOIP/SIP/MAPI/IMAP/PIMAP and/or other standards and protocols.

In both the system and method embodiments, a deleted message aged indicator checks the age of messages in a deleted message folder, when there are deleted messages stored therein. Once messages are deleted, the deleted message age indicator is checked by the visual voicemail platform/server (410) during message synchronization, which shares deleted message timestamps with the visual voicemail platform. The visual voicemail platform can delete the messages based on the global delete time value but before the original aged expiration timer elapsed, as distinguished from known operation.

The deleted message age indicator is programmable on the visual voicemail platform. In addition, the subscriber may adjust the time for the deleted message age indicator at the subscriber handset In this case, initial checking/synchronization between the subscriber handset and visual voicemail platform is not be required from the voicemail platform as it is initiated by the subscriber handset. Under some operating conditions, however, master control of deleted message age indicator is set (controlled) by the voicemail platform to allow the service provider to better manage the network resources required to support voicemail messages.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method comprising:
   determining a deleted message age indicator of a voicemail message based on a timestamp of a delete message command related to the voicemail message;
   determining whether the deleted message age indicator of the voicemail message has reached a global delete time value, wherein the global delete time value is based on network resources required to support all voicemail messages of all users that are stored using the network resources; and
   permanently deleting the voicemail message in response to determining that the deleted message age indicator of the voicemail message has reached the global delete time value.

2. The method of claim 1, wherein the timestamp of the delete message command is set to a date and time when the delete message command is received.

3. The method of claim 1, further comprising:
   marking the voicemail message for deletion in response to receiving the delete message command.

4. The method of claim 1, further comprising:
   determining that the voicemail message has been marked for deletion by a user; and
   accessing the voicemail message in a voicemail store.

5. The method of claim 4, wherein the accessing is a step of a synchronization process between a visual voicemail platform and the voicemail store.

6. The method of claim 1, further comprising changing the global delete time value is response to determining a change in network resources required to support all voicemail messages of all users that are stored using network resources.

7. An apparatus comprising:
a processor; and
a memory to store computer program instructions, the computer program instructions when executed on the processor cause the processor to perform operations comprising:
determining a deleted message age indicator of a voicemail message based on a timestamp of a delete message command related to the voicemail message;
determining whether the deleted message age indicator of the voicemail message has reached a global delete time value, wherein the global delete time value is based on network resources required to support all voicemail messages of all users that are stored using the network resources; and
permanently deleting the voicemail message in response to determining that the deleted message age indicator of the voicemail message has reached the global delete time value.

8. The apparatus of claim 7, wherein the timestamp of the delete message command is set to a date and time when the delete message command is received.

9. The apparatus of claim 7, the operations further comprising:
marking the voicemail message for deletion in response to receiving the delete message command.

10. The apparatus of claim 7, the operations further comprising:
determining that the voicemail message has been marked for deletion by a user; and
accessing the voicemail message in a voicemail store.

11. The apparatus of claim 10, wherein the accessing is a step of a synchronization process between a visual voicemail platform and the voicemail store.

12. The apparatus of claim 7, the operations further comprising changing the global delete time value is response to determining a change in network resources required to support all voicemail messages of all users that are stored using the network resources.

13. A computer readable storage device storing computer program instructions, which, when executed on a processor, cause the processor to perform operations comprising:
determining a deleted message age indicator of a voicemail message based on a timestamp of a delete message command related to the voicemail message;
determining whether the deleted message age indicator of the voicemail message has reached a global delete time value, wherein the global delete time value is based on network resources required to support all voicemail messages of all users that are stored using the network resources; and
permanently deleting the voicemail message in response to determining that the deleted message age indicator of the voicemail message has reached the global delete time value.

14. The computer readable storage device of claim 13, wherein the timestamp of the delete message command is set to a date and time when the delete message command is received.

15. The computer readable storage device of claim 13, the operations further comprising:
marking the voicemail message for deletion in response to receiving the delete message command.

16. The computer readable storage device of claim 13, the operations further comprising:
determining that the voicemail message has been marked for deletion by a user; and
accessing the voicemail message in a voicemail store.

17. The computer readable storage device of claim 16, wherein the accessing is a step of a synchronization process between a visual voicemail platform and the voicemail store.

* * * * *